United States Patent [19]

Nishiwaki et al.

[11] Patent Number: 4,641,913

[45] Date of Patent: Feb. 10, 1987

[54] OPTICAL INTEGRATED CIRCUIT UTILIZING THE PIEZOELECTRIC AND PHOTOCONDUCTIVE PROPERTIES OF A SUBSTRATE

[75] Inventors: Yoshikazu Nishiwaki; Yozo Nishiura, both of Osaka, Japan

[73] Assignee: Sumitomo Electric Industries, Ltd., Osaka, Japan

[21] Appl. No.: 692,872

[22] Filed: Jan. 18, 1985

Related U.S. Application Data

[63] Continuation of Ser. No. 408,891, Aug. 17, 1982, abandoned.

[30] Foreign Application Priority Data

Aug. 17, 1981 [JP] Japan .................................. 56-127689
Jan. 20, 1982 [JP] Japan .................................... 57-7207
Jan. 20, 1982 [JP] Japan .................................... 57-7208

[51] Int. Cl.[4] ................................................ G02B 6/12
[52] U.S. Cl. ............................ 350/96.11; 350/96.12; 350/96.13; 350/96.14; 350/358
[58] Field of Search ................. 350/96.10, 96.11, 96.12, 350/96.13, 96.14, 358; 365/112, 157; 310/311, 313 R, 313 A; 333/150, 151

[56] References Cited

U.S. PATENT DOCUMENTS

| | | | |
|---|---|---|---|
| 3,805,195 | 4/1974 | Miller | 365/157 |
| 3,874,782 | 4/1975 | Schmidt | 350/96.14 |
| 3,906,462 | 9/1975 | Feinleib et al. | 365/112 |
| 3,956,647 | 5/1976 | Mitchell et al. | 333/151 |
| 4,372,642 | 2/1983 | Singer et al. | 350/96.12 |
| 4,536,861 | 8/1985 | Graindorge et al. | 367/149 |

OTHER PUBLICATIONS

Japanese Journal of Applied Physics, vol. 19, Suppl. 19-1, 1980, Tokyo, C. S. Tsai "Integrated . . . Processing" pp. 661 to 665.
IEEE Journal of Quantum Electronics, vol. 14, No. 6, 1978, J. T. Boyd et al "Effect of Waveguide . . . Dynamic Range" pp. 437 to 443.
Tada et al., "Bismuth Silicon Oxide Single . . . " Sumitomo Electric Industries Ltd. Denshi, Tokyo, 1979 pp. 109–113.
Chen et al., "Integrated Optical Circuits . . . " S.P.I.E. pp. 8–22, vol. 218 (1980).
Marx et al., "Integrated Optical Detector . . . "IEEE Journal of Solid State Circuits, vol. Sc-12, No. 1 (Feb. 1977) pp. 10–13.
Hamilton et al., "An Integrated Optical . . . " Optical Engineering, vol. 16, No. 5, Sep./Oct. 1977, pp. 475–478.

Primary Examiner—William L. Sikes
Assistant Examiner—Brian M. Healy
Attorney, Agent, or Firm—Cushman, Darby and Cushman

[57] ABSTRACT

The present invention provides optical integrated circuits in which both a light function zone and a light reception zone are monolithically formed on the same substrate to obtain high reliability and low noise and loss. The optical integrated circuits according to the present invention have improved electrode structure formed on a light wave guide layer to apply a major portion of the electric field generated by the current flowing in the electrode structure within the light wave guide layer to thus improve light receiving sensitivity. Further, the optical integrated circuits according to the present invention have the light reception zone of the large photoconductive effect on the substrate to develop a light receiving sensitivity to the light function zone without affecting propagation loss.

12 Claims, 9 Drawing Figures

OPTICAL INTEGRATED CIRCUIT UTILIZING THE PIEZOELECTRIC AND PHOTOCONDUCTIVE PROPERTIES OF A SUBSTRATE

This is a continuation of application Ser. No. 408,891 filed Aug. 17, 1982 which was abandoned upon the filing hereof.

BACKGROUND OF THE INVENTION

The present invention relates to optical integrated circuits in which both a light function zone and a light reception zone (for changing a propagation state of light) are monolithically formed on the same substrate, and which, in order to enhance a light receiving sensitivity, have their improved electrode structures formed on a light wave guide layer and have an improved photoconductive effect of a light reception zone.

It has previously been proposed to form the light function zone which makes use of a piezo-electric effect and the light reception zone for light from this light function zone on separate substrates, as shown in FIG. 1. Take, for example, a spectrum analyzer for electric signal which makes use of light, a light wave guide layer 2 is formed on a substrate 1. An acoustic optical element as a light function element 3 which makes use of a piezo-electric effect is provided on the light wave guide layer 2 on the substrate 1 and in the travel path of light. A transducer 3b connected to a power source 3a generates distortion in the light wave guide layer 2 due to a piezo-electric effect. This distortion propagates through the wave guide layer 2 as an ultrasonic wave causing a change in refractive index of the layer 2. An incident light $I_{in}$ passes through this zone to produce a diffraction light $I_d$ due to the effects of this acoustic optical element. The diffracted light $I_d$ is received by an image sensor 4 on another substrate (not shown) separate from substrate 1. A disadvantage attendant such an arrangement is that it is difficult to accurately adjust the respective optical axes of the light wave guide layer 2 and the image sensor 4 since they are separately formed, and that difficulty is involved in assembling and reliability is low. Depending upon how light is emitted from the light wave guide layer 2, a scattering and a coupling loss may be caused, thereby incurring a loss of emission and an increase of noise. With the image sensor 4 in which the array is so included in the light reception cell as to be linear and perpendicular to the optical axis, a greater diffraction angle $\theta_B + \Delta B$ is obtained, the greater the distance of propagation the more the sensor is subjected to diffusion of beam to permit occurrence of noise thereby lowering the S/N ratio.

SUMMARY OF THE INVENTION

Accordingly, it is an object of the present invention to provide an optical integrated circuit which is positively assembled with high reliability and which is capable of preventing the circuit from generating a noise and increasing the same without any loss.

It is a further object of the present invention to provide an optical integrated circuit with an improved electrode structure formed on a light wave guide path to enhance light receiving sensitivity when light passes through the light wave guide path.

It is a still further object of the present invention to provide an optical integrated circuit arranged so that only a photoconductive effect of the light reception zone is improved to develop light receiving sensitivity without affecting propagation loss in the light function zone.

To this end, a fundamental concept of the present invention is to provide a light wave guide layer on a substrate of an optical integrated circit which includes a light function zone which makes use of a piezo-electric effect and is disposed in the travel path of light of the light wave guide layer having the piezo-electric effect and a photoconductive effect; and a light reception zone which make use of the photoconductive effect and is arranged behind the travel path of the light function zone, the two zones being monolithically formed (on the same substrate). According to the present invention, the electrodes in array are arranged on the same light wave guide layer to apply a major portion of the electric field within the light wave guide layer to thus improve light receiving sensitivity. Further, according to the present invention, the light reception zone of the large photoconductive effect is provided to thus develop a light receiving sensitivity to the light function zone without affecting propagation loss.

The present invention will be more fully understood from the detailed description given hereinbelow and the accompanying illustrations which are intended to describe but not limit the scope of the present invention.

DETAILED EXPLANATION OF THE INVENTION

Figure 2:
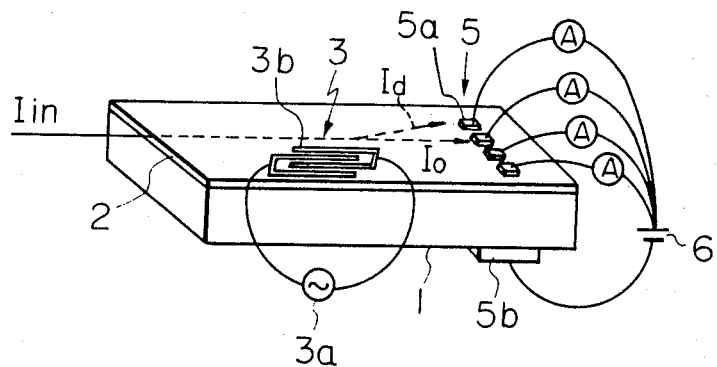
FIG. 2 is a perspective view of a preferred embodiment of an optical integrated circuit according to the present invention.

Now, FIG. 2 shows a light spectrum analyzer including the optical integrated circuit arrangement of the present invention. A light wave guide layer 2 having a piezo-electric effect and a photoconductive effect is formed on a substrate 1. Light is incident on one side of layer 2 and propagates through it to the other side thereof. An ultrasonic transducer 3b serves to cause a portion of layer 2 to act as a light function zone 3 for controlling a propagation characteristic of light traveling through layer 2. Transducer 3b is disposed in the light wave guide layer 2 and in the travel path of light. A power source 3a is connected to the ultrasonic transducer 3b. This ultrasonic transducer 3b is adapted to propagate ultrasonic waves to the light wave guide layer 2 by a piezo-electric effect to subject the light wave guide layer 2 to change in refractive index and to different the incident light $I_{in}$ propagating through it.

Electrodes 5a, 5b of light reception zone 5 are formed behind the travel path of light in the ultrasonic transducer 3b and in positions where the light wave guide layer 2 is held therebetween, that is, the top of the guide layer 2 and the underside of the substrate 1. Due to the light wave guide layer 2 of material having a photoconductive effect, when voltage from the power source 6 is applied between the electrodes 5a, 5b, the light wave guide layer 2 between the electrodes 5a, 5b through which light passes is susceptible to energization of current to detect difference in current between the other electrodes 5a, 5b. The electrodes 5a, 5b of light reception zone 5 are shown in FIG. 2 as being formed on the top of the guide layer 2 and the underside of the substrate 1, they may be provided on the top of the guide layer, and between the guide layer and the substrate. Although the electrodes 5a are present in plural number and the electrode 5b is in the form of a single plate, at least either of the electrode 5a or 5b may be in plural number to this end.

Electrodes 5a, 5b are shown in FIG. 2 as being linearly arranged perpendicular to the optical axis. However, as an alternative, they may be disposed in the form of a circular arc by taking uniform diffusion of the diffracted beam into accout as it does not necessarily follow that they should be linear. In this manner, the current drained between the opposed electrodes 5a, 5b is measured by an ampere meter A to thus detect the quantity of light passing between the opposed electrodes 5a, 5b, that is, the diffracted light derived from the ultrasonic wave emitted from the ultrasonic transducer 3b.

The electrodes 5a, 5b may be fabricated simultaneously with the ultrasonic transducer 3b and the light wave guide layer 2 on the substrate 1 by an IC manufacturing process for a photolithography.

As described in the preferred embodiment, according to the present invention, the light function zone and the reception zone are simultaneously made by the conventional IC manufacturing process so that the location of these parts may be secured relative to each other to eliminate difficulty involved by adjustment of the optical axis in assembling and avoid deterioration of dependability. Further, since no light is emitted by passing through the light wave guide layer, either loss or noise is minimized. In addition, any arrangement of the electrodes as the light reception zone may be made without any difficulty. For example, if a diffraction angle is widened, it is enough to have the electrodes close to the side of the light source so that any noise derived from diffusion of light beam may be minimized.

The optical integrated circuit shown in FIG. 2 is, however, adapted so that the light reception zone forms a structure which comprises the electrodes 5a in array on the top of the light wave guide path 2, and the opposed electrodes 5a disposed facing the other electrodes with the guide path 2 and the substrate 1 therebetween. With this arrangement, a portion of voltage applied from the external power source 6 is also drained to the substrate 1. Thus, little change is caused in current applied to the external circuit between the cases where light is passed and not passed.

Figure 3:
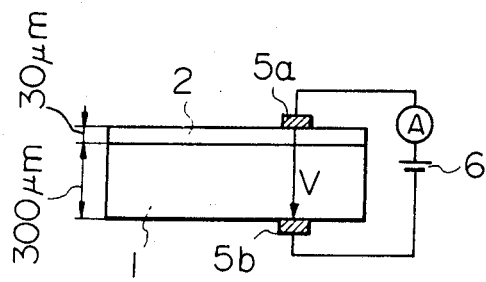
FIG. 3 is a representation explanatory of the optical integrated circuit in FIG. 2.

FIG. 3 is a representation explanatory of the optical integrated circuit shown in FIG. 2. Both or either of gallium Ga and calcium Ca is doped in the substrate formed of bismuth silicon oxide $Bi_{12}SiO_{20}$ (hereinafter referred to as "BSO"), and the electrodes 5a, 5b are formed to face each other on the top of light wave guide path 2 which has been epitaxially grown up and on the underside of the substrate 1. When light passes through the light wave guide path 2 right under the electrodes 5a with voltage V being applied by the power source 6 between the electrodes 5a and 5b, resistance value is lowered by the photoconductive effect of the light wave guide path 2 to subject the current applied to the external circuit to a change. Now, specific resistances of the substrate 1 and the guide path 2, and specific resistance of the guide path 2 when light is emitted are expressed by $\rho_1$, $\rho_1$ and $\rho_2$ whereas the thickness of the substrate 1 and the guide path 2 are expressed by 300 $\mu$m and 30 $\mu$m, the respective current $I_1$, $I_2$ applied through the electrodes 5a to the external circuit between the cases where light is passed and not passed, may be obtained from the following equation, when either light passes right under the electrodes 5a or does not passes.

$$I_1 = \frac{V}{300\rho + \rho_1} \cdot I_2 = \frac{V}{300\rho + \rho_2} \qquad (1)$$

When the respective specific resistances are put as $$\rho_1 = \rho \cdot \rho_2 = \frac{\rho_1}{a}$$

(where a is a constant), changes in current applied to the external circuit between the cases where light is passed and not passed may be obtained by the following equations.

$$(I_1/I_2)A = \frac{300\rho + 30\rho_2}{300\rho + 30\rho_1} \qquad (2)$$

$$= \frac{10\rho + \frac{\rho}{a}}{11} = \frac{10}{11} + \frac{1}{11a}$$

Figure 4:
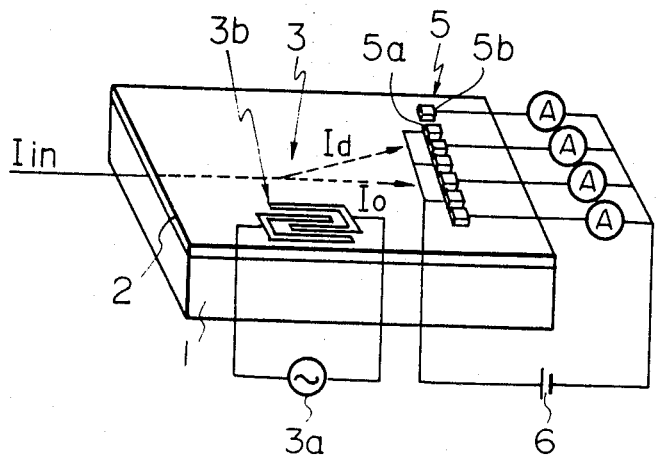
FIG. 4 is a view showing another embodiment of an optical integrated circuit according to the present invention.

FIG. 4 is a view showing another embodiment of an optical integrated circuit of the present invention, wherein like numerals 1-6 are used to designate like parts in FIG. 2. The electrodes in array are made by the conventional IC manufacturing process such as photolithographic process and the like. These electrodes are arranged so that current applied to the respective electrodes may be detected by the ampere meter in such a manner that a set of the electrodes in even numbers and another set of the electrodes in odd numbers are maintained to render potential equivalent when the electrodes are numbered from the end of arrays. The quantity and location of light may be detected due to change in current applied to the external circuit between the cases where light passes through the light wave guide path between the electrodes 5a and 5b and light does not pass.

Figure 5:
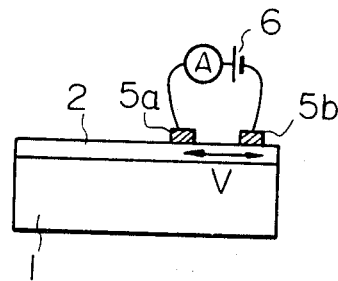
FIG. 5 is a representation explanatory of the optical integrated circuit in FIG. 4.

FIG. 5 is a view explanatory of an optical integrated circuit in FIG. 4. The electrodes 5a, 5b are disposed to face each other to apply voltage V between the electrodes 5a, 5b. In this instance, when the distance between the electrodes 5a and 5b is short enough as compared with the thickness of the guide path 2, voltage is considered as having applied to only the area of the guide path 2, where currents $I_1$, $I_2$ are expressed by means of the following equation:

$$I_1 \propto \frac{V}{1} \cdot I_2 \propto \frac{V}{2}$$

$$(I_1/I_2)B = \frac{\rho_2}{\rho_1}$$

$$= \frac{1}{a} \text{ (wherein } a \text{ is a constant)}$$

Specific resistance $\rho_1$ of the BSO substrate 1 in which gallium Ga and calcium Ca are doped, and specific resistance $\rho_2$ thereof when irradiated by light in wave length 400 nm, with length of 0.3 mW/cm$^2$ may be put as $$\rho_1 = 10^{12} (\Omega \cdot cm) \cdot \rho_2 = 10^3 (\Omega \cdot cm)$$
$$a = \rho_1/\rho_2 = 10^4$$

Thus, changes in current according to the conventional manner between the cases where light is passed and not passed, are $$(I_1/I_2)A = \frac{10}{11} + \frac{1}{11 \times 10^4} \approx 0.90$$

In contrast, changes in current according to the present invention are $$(I_1/I_2)B = \frac{1}{10^4} = 0.0001$$

to remarkably improve light receiving sensitivity.

As set forth hereinafter, an advantage derived from the optical integrated circuit in FIG. 4 is that great change in current drained to the external circuit between the cases where light is passed and not passed are obtained to improve light receiving sensitivity since a major portion of the electric field is applied within the light wave guide path.

For further improvement on the light receiving sensitivity, more change in composition of the light reception zone than that of the light wave guide path develops a photoconductive effect. On the other hand, for further development of photoconductive effect of the light reception zone, changes in variety or density of impurity in a zone to be light received are made with respect to a zone to be a wave guide path when the light wave guide path is formed by an epitaxial growth or a diffusion.

The optical integrated circuit in FIG. 4 has however proposed to provide the light wave guide path 2 having the same characteristics as those of the light function zone 3 and the light reception zone 5. In general, a photoconductive effect is derived from absorption of light so that material with a great photoconductive effect presents problems such as a great propagation loss. Although a layer in which either or both of gallium Ga and calcium Ca is doped and epitaxially grown on BSO has higher refractive index with respect to the substrate, its photoconductive effect is weakened (little change is shown for light of 500 nm–600 nm) as compared with that of non-dope BSO (irradiation of light with 0.3 W/cm$^2$ in wave length of 500 nm to dark resistance of $10^{12}$ $\Omega \cdot cm$ to reduce the latter to $10^9$ $\Omega \cdot cm$). Much effect is not expected even if the light wave guide path in itself is used as the light reception zone which utilizes a photoconductive effect.

Figure 1:
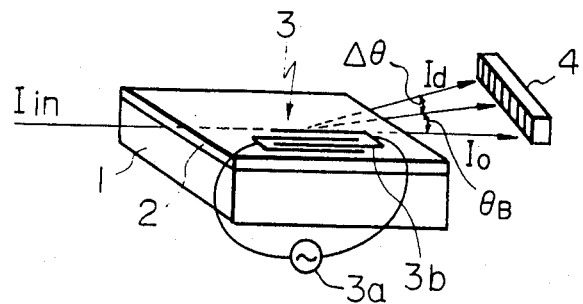
FIG. 1 is a perspective view of the conventional light spectrum analyzer.
Figure 6:
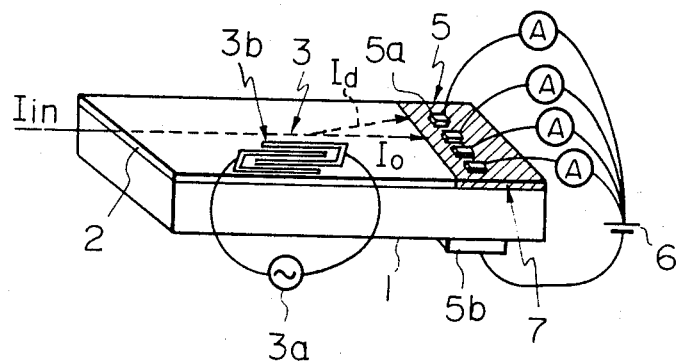
FIG. 6 is a representation of still another embodiment of the optical integrated circuit of the present invention.

FIG. 6 is a representation of still another embodiment of the optical integrated circuit of the present invention, wherein numerals 1–6 are used to designate the same parts in FIG. 1. Numeral 7 designates a layer formed of a medium with a higher photoconductive effect. In a process for making the light wave guide path 2 by way of epitaxial growth, metal diffusion or ion implantation in order to subject only a portion of the guide path used as the light reception zone 5 to a marked photoconductive effect, variations are made in formation in selection and density of dopant (including non-dopant) of the epitaxial layer or of diffusion (or ion implantation) material.

Figure 7:
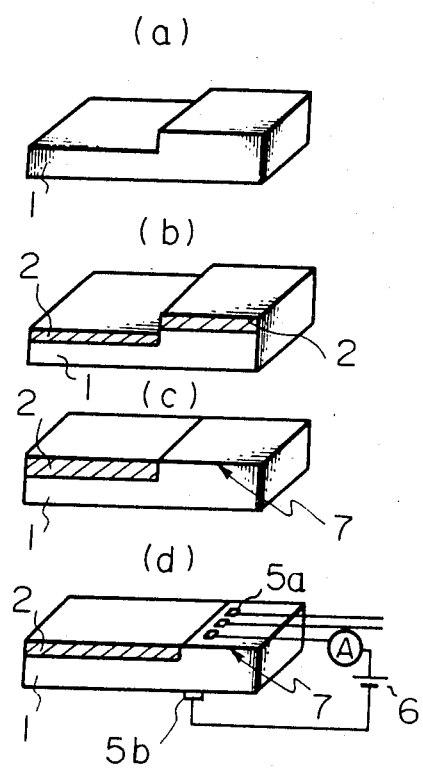
FIG. 7 is a view explanatory of a procedure in which the optical integrated circuit in FIG. 6 is made by epitaxial growth.

FIG. 7 is a view showing the procedure by which the optical integrated circuit in FIG. 6 is made by epitaxial growth. As shown in FIG. 7(a), the BSO substrate 1 is etched to leave some portion thereof as it is. Then, the whole surface of the etched portion of the substrate is doped with gallium Ga, calcium Ca for epitaxial growth to form a partially crowned Ga, Ca doped BSO epitaxial layer 2, as shown in FIG. 7(b). Only this undesirable partially crowned epitaxial layer 2 is etched to expose the surface of the original BSO substrate 1, as shown in FIG. 7(c). The light receiving electrodes 5a, 5b are formed in the light reception zone 7 of the BSO substrate, as shown in FIG. 7(d) to detect the location of the waveguide light so that a higher photoconductive effect of non-dope BSO with a higher sensitivity is applied to the light reception zone. With the thickness of the BSO substrate being ignored, the light receiving sensitivity of the present invention is increased up to 100 times or more as compared with the conventional optical integrated circuit.

Figure 8:
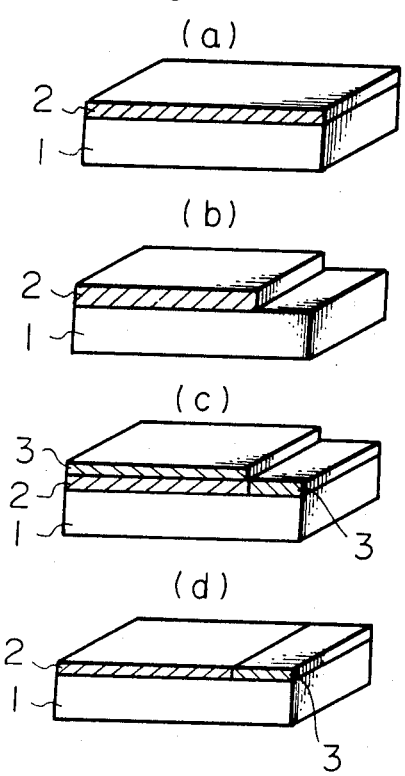
FIG. 8 is a representation of a procedure in which a zone to be used as the light receiving zone is manufactured by epitaxial growth.
Figure 9:
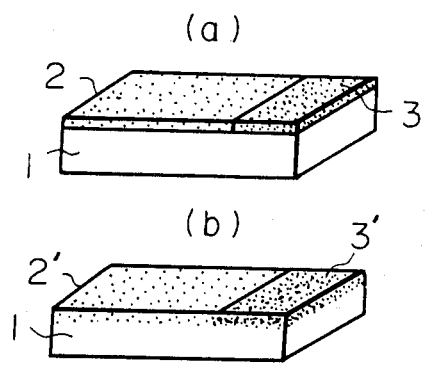
FIG. 9 is an explanatory view of a procedure in which the circuit is fabricated by varying and diffusing the composition of the waveguide area and the light reception zone.

FIG. 8 is a representation of a procedure in which an area which is used as the light receiving zone is also formed by epitaxial growth. FIG. 9 is a view showing the procedure by which the circuit is fabricated by varying and diffusing composition of the waveguide area and the light reception zone. According to the epitaxial growth, the circuit may be manufactured by the following steps which may be taken: (a) to prepare the epitaxial layer which is used as the waveguide path on the desired surface of the BSO substrate 1; (b) to remove only the epitaxial layer in the area to be used as the light receiving zone by a wet etching relying on an ion etching or an acid; (c) to grow the epitaxial layer of composition to be used as the light reception zone on the same surface, and (d) to remove only the portion that grows upwardly of the epitaxial layer 2 out of the other epitaxial layer 3. According to the diffusion procedure, the circuit may be fabricated by the following steps which may be taken; (a) to prepare by vacuum evaporation or sputtering, the thin layers 2 and 3 of different metal materials and the like which vary in amount, in the area to be used as the waveguide path on the desired surface of the BSO substrate 1, and (b) to heat material for the thin layers 2, 3 at a high temperature to diffuse it within the substrate 1 to vary its composition in the waveguide path 2' and the light reception zone 3'.

An advantage derived from the optical integrated circuit in FIG. 6 is that only the photoconductive effect of the light reception zone is improved to thus develop a light receiving sensitivity to the light function zone without affecting propagation loss.

The invention being best described, it will be obvious that the same may be varied in many ways. Such variations are not to be regarded as a departure from the spirit and scope of the invention and all such modifications as would be obvious to one skilled in the art are intended to be included in the scope of the following claims.

What is claimed is:

1. A monolithic optical integrated circuit comprising:
   a substrate made of a material capable of exhibiting both piezo-electric and photoconductive properties;
   a light wave guide layer, monolithically formed with said substrate and also capable of exhibiting both piezo-electric and photoconductive properties, said light wave guide layer having first and second zones;
   transducer means, coupled to said light wave guide layer in said first zone, for creating acoustic stresses in said light guide layer causing the piezoelectric property of the first zone to propagate surface waves which deflect light passing through the first zone to the second zone; and
   at least a pair of electrodes placed in spaced apart relation to each other on said light wave guide layer in said second zone, the electrodes being coupled in circuit with a voltage source and a current indicator to create an electric field through a portion of the light waveguide layer so that when light arrives at the second zone the light will change the resistivity of the photoconductive material between the electrodes due to the photoconductive property of said light wave guide layer, the resulting change in resistivity causing a change in current which is measured at the current indicator, so that the measured current represents a change in the intensity of the light arriving at the second zone, thereby utilizing the photoconductive property of said light wave guide layer in said second zone as an indicator of a change of propagation of light through said first zone of said light wave guide layer.

2. An optical integrated circuit as claimed in claim 1 wherein said second zone has a greater photoconductive effect than that of the first zone.

3. An optical integrated circuit as claimed in claim 2 when said light wave guide path is formed by epitaxial growth or metal diffusion, and substrate material provides a greater photoconductive effect as compared with said light wave guide path, said substrate material in itself is used as said light reception zone.

4. An optical integrated circuit according to claim 1 wherein said transducer means comprises an ultrasonic transducer.

5. An optical integrated circuit according to claim 1 wherein said optical integrated circuit comprises a plurality of opposed electrodes traversing an optical axis of said second zone to form a plurality of power application passages across said light wave guide layer.

6. An optical integrated circuit according to claim 2 wherein the first and second zones of said light wave guide layer are doped semiconductor material and the first and second zones are doped differently from each other.

7. An optical integrated circuit according to claim 2 wherein the first and second zones of said light wave guide layer are formed by semiconductor material that has been diffused and the first and second zones are been diffused with different materials.

8. An optical integrated circuit according to claim 2 wherein said light wave guide layer comprises an epitaxially grown semiconductor layer.

9. An optical integrated circuit according to claim 2 wherein said light wave guide layer comprises metal-diffused semiconductor layer.

10. An optical integrated circuit according to claim 1 further comprising an external circuit for measuring current from said electrode means.

11. A monolithic optical integrated circuit comprising:
    a substrate made of a material capable of exhibiting both piezo-electric and photoconductive properties;
    a light wave guide layer, monolithically formed with said substrate;
    transducer means, coupled to said light wave guide layer for creating acoustic stresses in said light guide layer causing the piezoelectric property to propagate surface waves which deflect light passing therethrough; and
    at least a pair of electrodes placed in spaced apart relation to each other on said light waveguide layer, the electrodes being coupled in circuit with a voltage source and a current indicator to create an electric field through a portion of the light waveguide layer so that when light arrives there at the light will change the resistivity of the photoconductive material between the electrodes due to the photoconductive property, the resulting change in resistivity causing a change in current which is measured at the current indicator, so that the measured current represents a change in the intensity of the light, thereby utilizing the photoconductive property of said substrate as an indicator of a change of propagation of light through said light wave guide layer and into said substrate.

12. An optical integrated circuit according to claim 11 wherein the substrate and light wave guide layer materials are selected such that the substrate exhibits a greater photoconductive effect than that of the light wave guide layer.

* * * * *